United States Patent Office 3,557,419
Patented Jan. 26, 1971

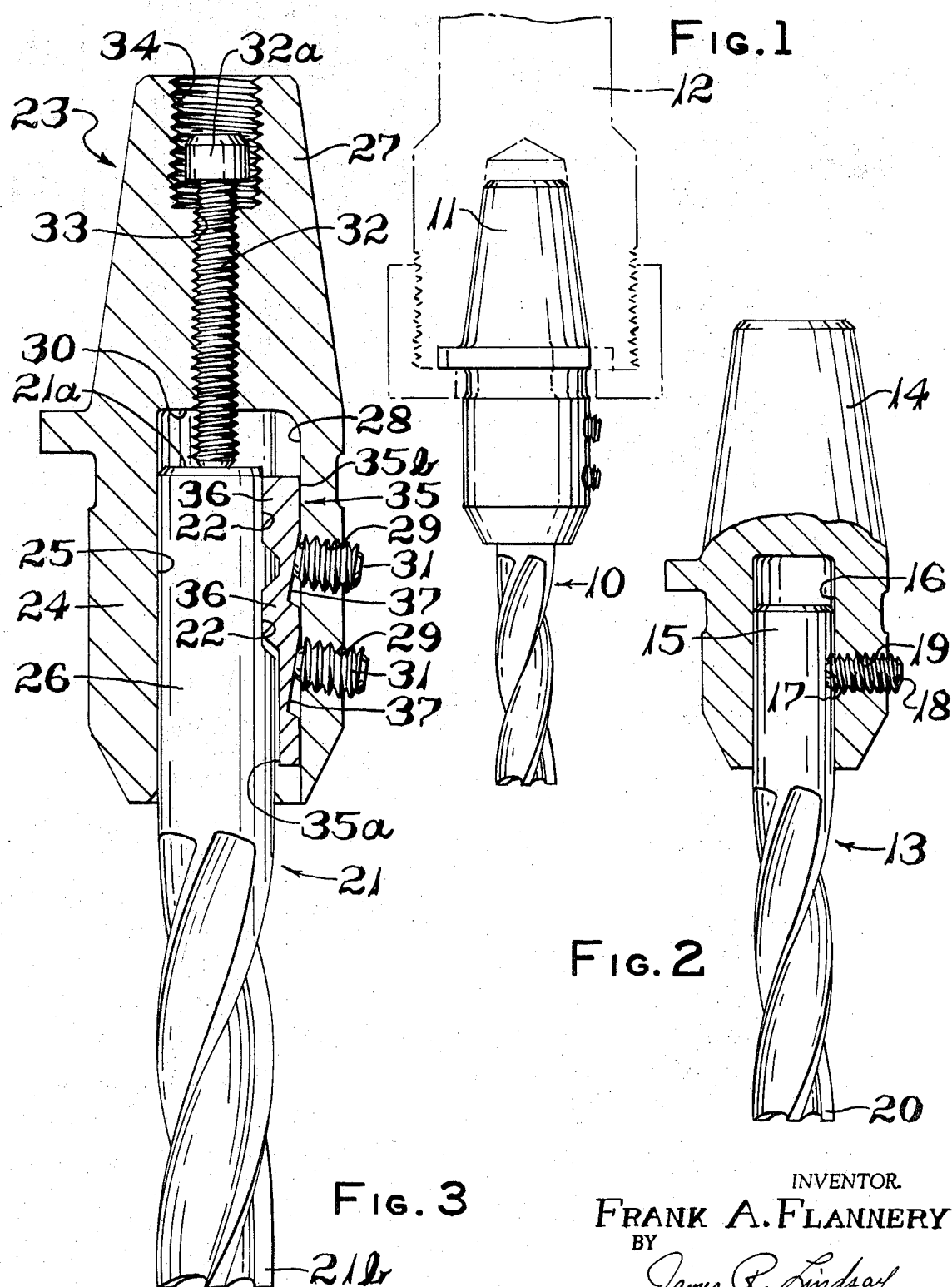

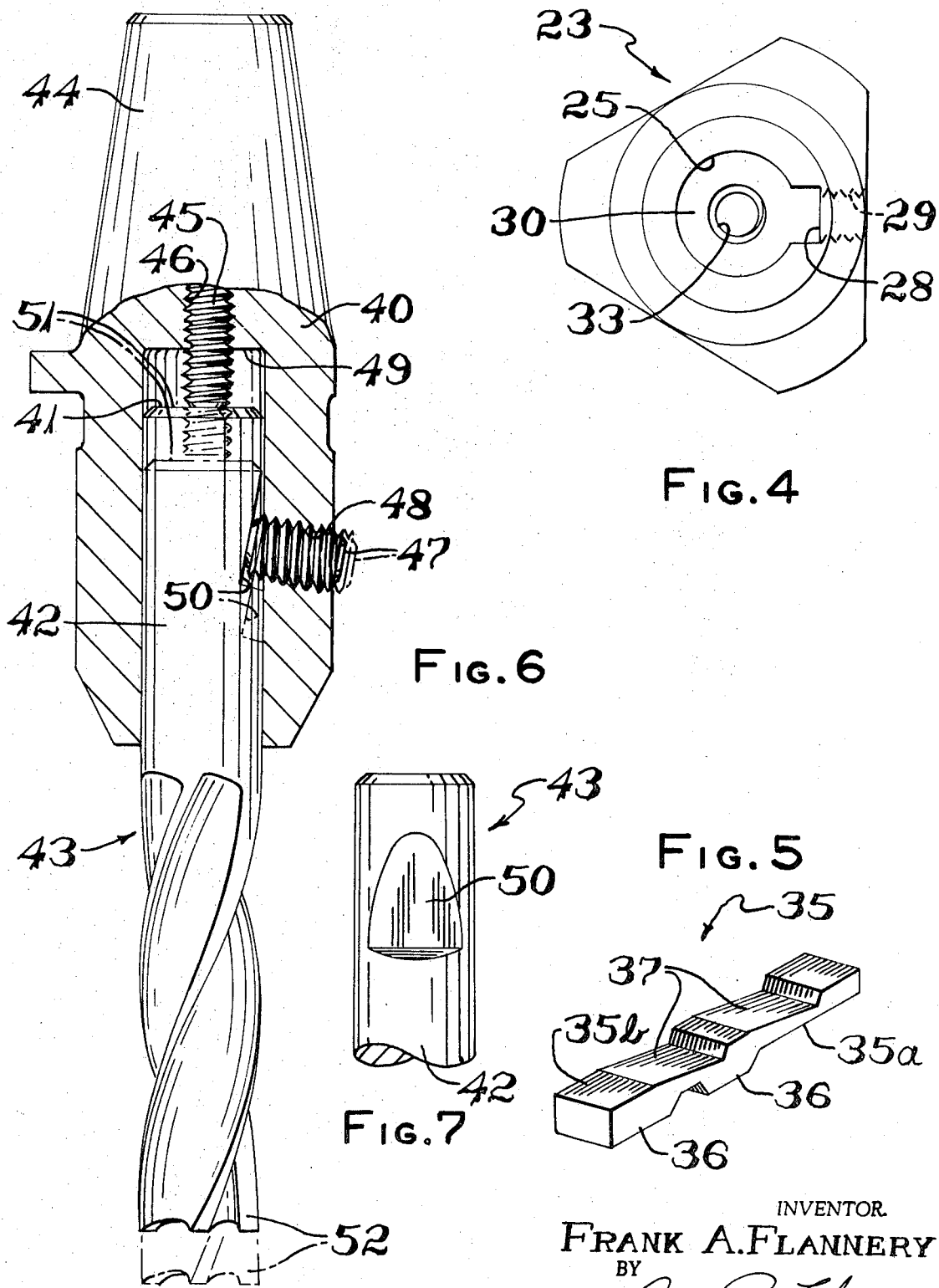

3,557,419
ADJUSTABLE CUTTING TOOL ASSEMBLY
Frank A. Flannery, 1875 Brookshire Road,
Akron, Ohio 44313
Filed June 25, 1969, Ser. No. 836,244
Int. Cl. B23b 5/22, 51/00; B26d 1/12
U.S. Cl. 29—105   10 Claims

ABSTRACT OF THE DISCLOSURE

Rotary cutting tools such as are used for boring, milling and slotting are mounted for longitudinal axial adjustment in rotary cutting machine tools by securing the cutting tool in a toolholder by means of a set screw which is canted toward the head of the toolholder. The set screw seats against a flat set-face that is sloped to present a planar face normal to the axis of the canted set screw and of sufficient length to permit seating of the set screw along a definitized length of the cutting tool. The sloped set-face may be cut into the side face of the cutting tool or into a key adapted to fit against the unsloped set-face of conventional commercial cutting tools. The tool holder is provided with an adjustable limit bolt for defining the depth to which the cutting tool can be inserted into the socket of the toolholder.

This invention relates to rotary cutting machine tools such as are used for boring, milling and slotting and pertains more particularly to means for securing the cutting tool in a toolholder so as to permit longitudinal axial adjustment of the cutting tool with reference to the toolholder.

Rotary cutting tools such as are used for boring, milling, slotting and the like conventionally are locked in position within a toolholder by means of a set screw that is threaded through the body of the toolholder and seats against a set-face cut in the side face of the cutting tool along a plane parallel to the longitudinal axis of the cutting tool. Such arrangement obviously does not provide for any axial adjustment of the cutting tool within the toolholder to compensate for the shortening of the length of the cutting tool resulting from grinding the cutting tip of the cutting tool to resharpen the cutting tool after the cutting tip has become dulled through use.

In computerized-controlled automated manufacturing procedures for mass-producing articles with little or no manual manipulation, it heretofore has been necessary either to produce a new computer program tape for controlling the operation of the machine tool or to secure the resharpened cutting tool in a new toolholder of greater length after each time a cutting tool is resharpened to compensate for the shortening of the length of the cutting tool occasioned by the reshapening in order that a "cut" of the desired depth will be realized. The reprogramming of a computer is a tedious and time-consuming procedure that leads to objectionable increased operating costs. The changing of the toolholder to one of greater length after each time a cutting tool is resharpened necessitates that a manufacturer maintain an excessive number of tool holders which also contributes to increased production costs. It is evident that a significant need exists for an arrangement which would permit a resetting of the cutting tool with respect to the toolholder in order to conveniently and inexpensively compensate for the shortening in length which results from resharpening a cutting tool.

The present invention provides such an arrangement in that the present invention provides a cutting tool assembly that permits convenient axial adjustment of the cutting tool within the toolholder and thereby allows the cutting tool to be moved axially within the toolholder a distance equal to the loss in length of the cutting tool suffered as a consequence of a resharpening. In accordance with this invention, the cutting tool is clamped in a toolholder by a set screw which is canted toward the head of the toolholder and which seats against a flat set-face that is sloped to present a planar face normal to the axis of the canted set screw and of sufficient length to present multiple settings for the seating of the set screw. The head of the toolholder is provided with an adjustable limit bolt that extends through the head of the toolholder and into the socket of the toolholder into which the proximal end of the cutting tool is inserted and defines the depth to which the cutting tool can be inserted into the socket of the toolholder. The sloping set-face against which the set screw seats in combination with the limit bolt allows the cutting tool to be reset axially with respect to the toolholder a length equal to the projected length of the sloping set-face.

The invention will be more fully understood from the following detailed description of two embodiments of the invention and by referring to the accompanying drawings in which:

FIG. 1 is a view in elevation of a cutting tool adjustably mounted in a toolholder in accordance with this invention and illustrating the toolholder housed within a conventional adapter (shown in phantom lines) of a machine tool;

FIG. 2 is a view in elevation, partly broken away and in section, illustrating the conventional commercial practice for securing a cutting tool in a toolholder;

FIG. 3 is a view in elevation, partly broken away and in section, showing a cutting tool and tool holder assembly embodying the present invention;

FIG. 4 is a bottom plan view of the toolholder housing shown in FIG. 3;

FIG. 5 is a perspective view of the key of the toolholder assembly shown in FIG. 3;

FIG. 6 is a view in elevation of a cutting tool and toolholder assembly which illustrates a second embodiment of the invention; and FIG. 7 is a fragmentary elevation view of the cutting tool shown in FIG. 6 rotated 90° to show a frontal view of the sloping set-face.

Referring to FIG. 1 of the drawings, an end mill cutting tool 10 is shown secured in toolholder 11 which in turn is associated with an adapter 12 (shown in phantom) of a machine tool. The adapter 12 is of a conventional design and forms no part of the present invention. The design of the adapter 12 depicted in FIG. 1 illustrates the adapter construction described in U.S. Pat. No. 2,611,621. However, it will be understood that the cutting tool assembly of the persent invention can be employed with any conventional type of machine tool adapter.

FIG. 2 illustrates the conventional manner of securing a cutting tool in a toolholder. As shown, the cutting tool 13 is associated with the toolholder 14 by inserting the proximal end 15 of the cutting tool 13 into the socket 16 of the toolholder 14 until the set-face 17 (cut into the side face of the cutting tool 13 and lying in a plane parallel to the longitudinal axis of the cutting tool 13) is aligned opposite the set screw 18 threaded through the internally-threaded opening 19 in the body of the toolholder 14. The set screw 18 is turned down until it seats firmly against the set-face 17 of the cutting tool 13. The secure seating of the set screw 18 against set-face 17 holds the cutting tool 13 firmly associated with toolholder 14 preventing axial movement of the cutting tool 13 within socket 16 of the toolholder 14 and preventing the independent rotation of the cutting tool 13 within the socket 16 of the toolholder 14. It will be appreciated that such arrangement for securing cutting tool 13 with toolholder 14 does not provide for any axial adjustment of cutting tool 13 within the socket 16 of toolholder 14. As a consequence, a convenient manner for compensating for a shortening of the length of the cutting tool 13 as a result of resharpening the cutting tip 20 of the cutting tool 13 is not provided by such conventional arrangement.

The embodiment of this invention shown in FIG. 3 allows a cutting tool 21 of conventional design (in that it is provided with planar set-faces 22, 22 cut in the side face of the cutting tool 21 in a plane parallel to the longitudinal axis of the cutting tool 21) to be securely clamped in a toolholder 23 with provision being made for axial resetting of the cutting tool 21 with respect to the toolholder 23. The toolholder 23 is comprised of a toolholder housing 24 that is provided with a generally cylindrical-shaped socket 25 extending axially inwardly from the bottom face of the base portion of toolholder housing 24 into which the proximal end 26 of the cutting tool 21 is inserted, and a generally truncated conical-shaped head 27 for insertion into the adapter 12 of the machine tool. The toolholder housing 24 is provided with a keyway 28 contiguous with socket 25 and extending generally parallel to the longitudinal axis of toolholder housing 24, as is shown clearly in FIGS. 3 and 4, and is provided with internally-threaded set screw holes 29, 29 that extend through the sidewall of the toolholder housing 24 and communicate with keyway 28. Set screw holes 29, 29 are canted toward the base 30 of socket 25 so that set screws 31, 31 when threaded through holes 29, 29 are canted forward toward the head portion 27 of the toolholder housing 24. A cant of about 10 to 30° from the normal to the longitudinal axis of the toolholder 23 usually is provided. The head 27 of toolholder housing 24 is provided with an axially-aligned limit bolt 32 threaded through an internally-threaded axially disposed hole 33 that communicates with socket 25. The limit bolt 32 functions as an adjustable "stop" to define the depth to which the cutting tool 21 can be inserted into socket 25, as will be explained hereinafter. The head 32a of limit bolt 32 is housed within axially-aligned recessed opening 34 which may be threaded as shown to accommodate attachment of the toolholder 23 to a threaded drawbolt (not shown) if conventional drawbolt means is utilized in the machine tool for securing the toolholder 23 in the adapter 12. A key 35 housed within keyway 28 of the toolholder housing 24 is provided with lands 36, 36 on the inner face 35a of key 35 that fit snugly into the recesses in the side face of the conventionally-designed cutting tool 21 which recesses were formed as a result of cutting the set-faces 22, 22 in the side face of the cutting tool 21. The opposite face 35b of key 35, i.e., the outer face of key 35, is provided with sloped set-faces 37, 37 against which set screws 31, 31 seat. The set-faces 37, 37 are sloped to present planar faces that are normal to the canted set screws 31, 31 threaded through holes 29, 29. The longitudinal lengths of set-faces 37, 37 are sufficient to provide multiple settings for the seating of set screws 31, 31 to allow the desired axial adjustment of the cutting tool 21 within toolholder 23. Desirably, the longitudinal length of set-faces 37, 37 are of sufficient length to allow at least about ½ inch axial adjustment of the cutting tool 21.

In utilizing the cutting tool assemby, the proximal end 26 of the cutting tool 21 is inserted into the socket 25 of the toolholder housing 24 the requisite distance to produce the desired depth of cut in the workpiece and the limit bolt 32 is tightened down until it just makes contact with the base 21a of the cutting tool 21. The limit bolt 32 then functions as a "stop" which limits the depth to which the cutting tool 21 can be inserted into socket 25 so long as the set of the limit bolt 32 is not altered. The key 35 is associated with the cutting tool 21 with the lands 36, 36 of key 35 fitting into the recesses in the side face of the conventional cutting tool 21 which were formed as a result of cutting the set-faces 22, 22 in the side face of the cutting tool 21, and the cutting tool 21 and key 35 in the said associated relationship are inserted into socket 25 and keyway 28 until the base 21a of the cutting tool 21 contacts limit bolt 32. With the cutting tool 21 and key 35 thus inserted in the toolholder housing 24, the set screws 31, 31 are tightened until they seat firmly against the sloping set-faces 37, 37 of key 35. The cutting tool 21, as a result, is securely clamped in toolholder 23. When the cutting tip 21b of the cutting tool 21 is dulled as a result of use and a length of the cutting tip 21b is ground off to present once again a sharp cutting edge, the cutting tool 21 can be reset axially with respect to the toolholder 23 to compensate for such loss in length in the cutting tool 21 by loosening set screws 31, 31 and withdrawing the cutting tool 21 from socket 25 of the toolholder housing 24 an amount equal to the loss in length of the cutting tool 21 occasioned by the sharpening. The limit bolt 32 then is tightened until it once again just contacts the base 21a of the cutting tool 21 and the set screws 31, 31 again are tightened until they firmly seat against the sloping set-faces 37, 37 of key 35. The cutting tool 21 once again is securely held in toolholder 23 and will cut the requisite depth "cut" in the workpiece. Resetting of the cutting tool 21 with respect to the toolholder 23 to compensate for loss in length of the cutting tool 21 occasioned by sharpening can be accomplished after each sharpening of the cutting tool 21 as long as the set screws 31, 31, when tightened, seat on the sloping set-faces 37, 37 of key 35. When the set screws 31, 31 no longer seat on the sloping set-faces 37, 37, the cutting tool 21 then will need to be replaced.

It will be appreciated that since the set screws 31, 31 are canted toward the head 27 of the toolholder housing 24 and seat against set-faces that are normal to the respective axis of the canted set screws 31, 31, the cutting tool 21 is prevented from moving axially from the socket 25 of the toolholder housing 24 until the set screws 31, 31 are loosened. Axial movement of the cutting tool 21 further into the socket 25 of the toolholder housing 24 is prevented by limit bolt 32. As a consequence, once the cutting tool 21 is secured as described in toolholder 23, accidental axial movement of the cutting tool 21 with respect to toolholder 23 is prevented during use of the cutting tool assembly.

While the embodiment of this invention shown in FIG. 3 embodies the use of two set screws 31, 31, it will be understood that a single set screw or more than two set screws may be used. The number of set screws used normally is determined by the size of cutting tool to be housed in a toolholder, the smaller diameter cutting tools being secured by a single set screw and the larger diameter cutting tools being secured with two or three set screws.

In the embodiment of this invention shown in FIG. 6, the toolholder 40 is provided with an axially-aligned generally cylindrical-shaped socket 41 into which the proximal end 42 of cutting tool 43 fits and a generally truncated conical-shaped head portion 44 for insertion into an adapter of a machine tool. A limit bolt 45 is threaded through an internally-threaded axially-aligned hole 46 in the manner shown in FIG. 3 and functions as an adjustable "stop" to limit the depth to which the cutting tool 43 can be inserted into the socket of toolholder 40. A set screw 47 is threaded into an internally-threaded set screw hole 48 that extends through the wall of toolholder 40 and communicates with socket 41 of toolholder 40. Set screw hole 48 is canted toward the base 49 of socket 41 which causes set screw 47 to be canted toward the head 44 of the toolholder 40. The proximal end 42 of cutting tool 43 is provided with a sloping set-face 50 that is cut in the side face of cutting tool 43 and that presents a planar face that is normal to the axis of set screw 47 threaded into set screw hole 48. The longitudinal length of set-face 50 is sufficient to provide multiple seatings for set screw 47 to permit axial adjustment of the cutting tool 43 with respect to toolholder 40 equal to the projected longitudinal length of the set-face 50.

To utilize the cutting tool and toolholder assembly shown in FIG. 6, the proximal end 42 of cutting tool 43 is inserted into socket 41 of toolholder 40 the requisite distance to provide a "cut" in the workpiece of the desired depth when the assembled cutting tool 43 and toolholder 40 are secured in the adapter of the machine tool. The limit bolt 45 is tightened until it just makes contact with the base 51 of cutting tool 43 and the set screw 47 then is tightened until it firmly seats against set-face 50 cut in the side face of cutting tool 43. The cutting tool 43, as a consequence, is securely locked in position within toolholder 40.

In order to compensate for a shortening in the length of cutting tool 43 occasioned by grinding off a portion of the cutting tip 52 of the cutting tool 43 to resharpen the cutting tool, set screw 47 is loosened and cutting tool 43 is axially removed from toolholder 40 a distance equal to the length of the cutting tool removed by the sharpening procedure. The limit bolt 45 is tightened until the limit bolt 45 again just contacts the base 51 of cutting tool 43 and the set screw 47 again is tightened until it firmly seats against set-face 50 of cutting tool 43. The cutting tool 43 once again will produce a cut of the same depth as was produced before the resharpening of the cutting tool. The cutting tool 43 can be axially reset with respect to the toolholder 40 as described above after each resharpening of the cutting tool to compensate for loss of length in the cutting tool occasioned by resharpening so long as the set screw 47, when tightened after the adjustment, seats against the sloped set-face 50. If the projected longitudinal length of the sloping set-face 50 were one inch, for example, a maximum axial movement of about one inch of the cutting tool 43 with respect to the toolholder could be realized. An axial reset of cutting tool 43 with respect to toolholder 40 is shown in phantom in FIG. 6. While a single set screw 47 and a single set-face 50 are shown in this embodiment, it will be understood that more than one set screw and accompanying set-face associated therewith can be used.

While the above embodiments illustrate the use of end mill cutting tools, it will be appreciated that the invention can be utilized with other types of rotary cutting tools for rotary cutting machine tools such as boring tools, slotting tools, and the like.

I claim:

1. An adjustable cutting tool assembly for use in rotary cutting machine tools which assembly comprises a toolholder provided with a head portion for association with the rotary cutting machine tool and a base portion that has a socket which extends axially-inwardly from the bottom face of the toolholder, a cutting tool having its proximal end inserted into said socket of said toolholder, the said head of said toolholder having an internally-threaded axially-disposed hole therethrough communicating with said socket of said toolholder, a limit bolt threaded through said axially-disposed hole in the head of said toolholder which serves to limit the depth to which the proximal end of said cutting tool can be inserted into the said socket in the base portion of said toolholder, set screw means for clamping said cutting tool within the said socket of said toolholder to prevent the withdrawal of said cutting tool from the said socket of said toolholder and to prevent the independent rotation of said cutting tool relative to said toolholder, said set screw means including a set screw which is threaded through the wall of said toolholder and is canted toward the said head portion of said toolholder and a set-face which presents a planar face normal to the axis of the said canted set screw and against which said set screw is seated, said planar set-face having a sufficient longitudinal length to provide multiple settings for the seating of said set screw to allow axial adjustment of said cutting tool with respect to said toolholder.

2. The cutting tool assembly of claim 1 wherein said cutting tool is provided with a recessed portion in the side face of the cutting tool providing a planar set-face parallel to the longitudinal axis of said cutting tool, wherein the said toolholder has a keyway that is contiguous with the said socket of the said toolholder and that extends parallel to the longitudinal axis of said toolholder and with which the said set screw threaded through the wall of said toolholder communicates, wherein said toolholder is provided with a key which is housed in said keyway and which has a land on its inner face that fits snugly into the said recessed portion in the side face of the cutting tool, and wherein said planar set-face normal to the axis of the said canted set screw and against which the said canted set screw is seated is provided on the outer face of said key.

3. The cutting tool assembly of claim 2 wherein the cant of said set screw is from 10° to 30° from the normal to the longitudinal axis of said toolholder.

4. The cutting tool assembly of claim 2 wherein the projected longitudinal length of the said planar set-face is at least about ½ inch whereby axial adjustment of the said cutting tool with respect to the said toolholder of at least about ½ inch can be realized.

5. The cutting tool assembly of claim 1 wherein said planar set-face normal to the axis of the said canted set screw and against which the said canted set screw is seated is provided in the side face of the proximal end of the said cutting tool.

6. The cutting tool assembly of claim 5 wherein the cant of said set screw is from 10° to 30° from the normal to the longitudinal axis of said toolholder.

7. The cutting tool assembly of claim 5 wherein the projected longitudinal length of the said planar set-face provided in the side face of the proximal end of the cutting tool is at least about ½ inch whereby axial adjustment of the said cutting tool with respect to the said toolholder of at least about ½ inch can be realized.

8. A toolholder assembly for clamping a rotary cutting tool having a recessed portion in its side face to present a planar set-face parallel to the longitudinal axis of the cutting tool which toolholder assembly comprises a toolholder housing which includes a head portion adapted to be associated with a rotary cutting machine tool and a base portion, the said base portion of said toolholder housing having a socket which extends axially-inwardly from the bottom face of the toolholder housing and a keyway that is contiguous with the said socket of the said toolholder housing and that extends parallel to the longitudinal axis of the toolholder housing, said toolholder housing having a set screw which is threaded through the sidewall thereof and communicates with said keyway and which is canted toward said head portion of said toolholder housing, the said head portion of said toolholder housing having an internally-threaded axially-disposed hole therethrough communicating with said socket in the base portion of said toolholder housing, a limit bolt threaded through said axially-disposed hole in the head portion of the toolholder housing which serves as an adjustable stop for limiting the depth to which a rotary cutting tool can be inserted into the said socket of said toolholder housing, a key housed in said keyway provided in said toolholder housing, said key being provided with a land on its inner face adapted to fit snugly into the said recessed portion in the side face of the rotary cutting tool and being provided with a planar set-face on its outer face that is normal to the axis of said canted set screw threaded through the sidewall of said toolholder housing and of sufficient longitudinal length to provide multiple longitudinal settings for said set screw threaded through the sidewall of said toolholder housing.

9. The toolholder assembly of claim 8 wherein the cant of said set screw threaded through the sidewall of the toolholder housing is from 10° to 30° from the normal to the longitudinal axis of said toolholder housing.

10. The toolholder assembly of claim 9 wherein the projected longitudinal length of the said planar set-face provided on the outer face of said key is at least about ½ inch in length.

References Cited
UNITED STATES PATENTS

| | | | |
|---|---|---|---|
| 2,167,014 | 7/1939 | Verderber | 279—83 |
| 2,283,514 | 5/1942 | Stanworth | 279—83 |
| 2,338,626 | 1/1944 | Emrick | 279—83 |
| 3,159,081 | 12/1964 | Erikson | 90—11 |

HARRISON L. HINSON, Primary Examiner

U.S. Cl. X.R.

77—71; 279—83